US010287971B2

(12) United States Patent
Holland

(10) Patent No.: US 10,287,971 B2
(45) Date of Patent: May 14, 2019

(54) OPPOSED PISTON ENGINE

(71) Applicant: Ronald A. Holland, Carlsbad, CA (US)

(72) Inventor: Ronald A. Holland, Carlsbad, CA (US)

( * ) Notice: Subject to any disclaimer, the term of this patent is extended or adjusted under 35 U.S.C. 154(b) by 0 days.

(21) Appl. No.: 15/920,286

(22) Filed: Mar. 13, 2018

(65) Prior Publication Data

US 2018/0202348 A1 Jul. 19, 2018

Related U.S. Application Data

(63) Continuation-in-part of application No. 14/613,247, filed on Feb. 3, 2015.

(Continued)

(51) Int. Cl.

| | |
|---|---|
| ***F02B 25/08*** | (2006.01) |
| ***F02B 23/06*** | (2006.01) |
| ***F02B 75/28*** | (2006.01) |
| ***F02B 75/32*** | (2006.01) |
| ***F02M 35/10*** | (2006.01) |

(Continued)

(52) U.S. Cl.

CPC ................ *F02B 25/08* (2013.01); *F01B 7/14* (2013.01); *F02B 23/0633* (2013.01); *F02B 23/0675* (2013.01); *F02B 25/00* (2013.01); *F02B 75/02* (2013.01); *F02B 75/282* (2013.01); *F02B 75/32* (2013.01); *F02M 35/1019* (2013.01); *F02B 2075/025* (2013.01); *Y02T 10/125* (2013.01)

(58) Field of Classification Search

CPC ......... F15C 1/002; F01B 9/023; F16F 15/261; F02B 25/02; F02B 25/20; F02B 25/08; F02B 23/0633; F02B 75/282; F02B 2075/025; F02M 35/104; F02M 35/1042; F02M 35/1019

USPC .......... 74/50; 123/184.52, 55.7, 53.4, 65 PD

See application file for complete search history.

(56) References Cited

U.S. PATENT DOCUMENTS 1,687,425 A * 10/1928 Briggs .................... F01B 9/023 123/197.4
1,799,369 A * 4/1931 Herr ........................ F02F 1/186 123/184.38

(Continued)

FOREIGN PATENT DOCUMENTS

BE 388676 A * 5/1932
BE 388676 A * 5/1932

(Continued)

*Primary Examiner* — Lindsay M Low
*Assistant Examiner* — Joshua Campbell
(74) *Attorney, Agent, or Firm* — Kenneth L. Green; Averill & Green

(57) ABSTRACT

An opposed piston engine includes approximately spherical combustion chamber formed by the two opposed pistons in a single cylinder and an intake manifold including gas hooks. The combustion chamber has a small cone shaped extension on each side leading to each of two opposed injectors located in the cylinder wall where the two pistons meet at the top of their stroke. The combustion chamber configuration reduces the surface area of the chamber and increases the burn length by a significant amount compared to known designs. The gas hooks in the intake manifold restrict the flow of exhaust gases into the intake manifold long enough for the pressure in the cylinder to blow down and the exhaust gasses to attain high velocity passing out through the exhaust manifold, allowing the intake ports to be uncovered before the exhaust ports.

16 Claims, 6 Drawing Sheets

Related U.S. Application Data

(60) Provisional application No. 61/935,591, filed on Feb. 4, 2014.

(51) Int. Cl.

*F02B 75/02* (2006.01)
*F02B 25/00* (2006.01)
*F01B 7/14* (2006.01)

(56) References Cited

U.S. PATENT DOCUMENTS 2,170,818 A * 8/1939 Hanson .................. F02B 23/00 123/257
2,359,564 A * 10/1944 Kilchenmann ........... F01B 7/14 123/51 BA
3,411,289 A * 11/1968 Antonsen .................. F01B 7/14 123/51 BA
3,981,280 A * 9/1976 Franke .................. F01B 1/0658 123/69 R
4,185,596 A * 1/1980 Noguchi ................. F02B 25/08 123/51 B
4,469,054 A * 9/1984 Onishi .................... F02B 17/00 123/430
RE32,802 E 12/1988 Kline
6,305,335 B1 * 10/2001 O'Toole .................. F02B 75/26 123/56.3
7,475,627 B2 * 1/2009 Irick ....................... F01B 9/023 417/534
2002/0112693 A1 8/2002 Stutz
2004/0045522 A1 * 3/2004 Raffaele .................. F01B 9/023 123/197.4
2007/0199313 A1 * 8/2007 Kumasaka ................ F01N 3/02 60/320
2011/0271932 A1 * 11/2011 Fuqua ....................... F01B 7/02 123/301
2012/0085305 A1 * 4/2012 Cleeves .................... F01L 1/30 123/90.26
2012/0186561 A1 * 7/2012 Bethel ..................... F02B 75/282 123/51 R
2012/0204841 A1 8/2012 Hofbauer

FOREIGN PATENT DOCUMENTS

GB 445556 A * 4/1936 .............. F02B 25/00
GB 2438868 A * 12/2007 .............. F23C 15/00
KR 100743236 B1 * 7/2007

* cited by examiner

OPPOSED PISTON ENGINE

CROSS-REFERENCE TO RELATED APPLICATIONS

The present application claims the priority of U.S. Provisional Patent Application Ser. No. 61/935,591 filed Feb. 4, 2014, and is a Continuation In Part of U.S. patent application Ser. No. 14/613,247 filed Feb. 3, 2015, which applications are incorporated in its entirety herein by reference.

BACKGROUND OF THE INVENTION

The present invention relates in general to opposed piston, direct injected, two strokes per cycle (two stroke), Internal Combustion (IC), opposed piston engines, and more particularly to new, improved technology for design and operation of these types of engines that provides, among other things, higher efficiency, more complete combustion, lower emissions, higher power per unit of displacement, and greater mechanical simplicity than prior art IC engines.

It is well known by those skilled in the art that in a direct injected, state of the art diesel combustion chamber the distance between the tip of the injection nozzle in the direction of the fuel spray and the end of the combustion chamber (burn length) is much less than desirable. When unburned fuel strikes a metal surface it fails to burn completely causing undesirable carbon emissions including PM10. But the volume of the combustion chamber must be kept very small to achieve the compression ratio necessary to ignite the fuel. So far the use of a single injector tip with multiple holes spraying fuel out into a partial toroidal shaped combustion chamber has proven to be the best design technology available for the present state of the art diesel engine even though some of the fuel remains unburned.

There is another problem with this shaped combustion chamber. It has significantly more surface area than that of more compact chambers of the same volume. The larger surface area causes added heat loss at the critical time of combustion which decreases the power and efficiency of the engine.

Because of the extreme pressure on the top of the piston at the time of combustion in the present state of the art diesel engine the crank shaft must be fitted with high friction, oil pressurized journal bearings and can not be successfully fitted with low friction roller bearings. And because of the oscillating motion of the connecting rods the pistons are forced back and forth against the cylinder walls causing even more friction and wear. These added frictional forces also decrease the power and efficiency of the engine. Accordingly, the need exists for a direct injected, IC engine that overcomes the afore described inefficiencies.

Known two-stroke engines required some form of supercharging to fill the cylinders. The power required to drive the supercharger reduces the efficiency of the known two-stroke engines.

Known Scotch yoke engines created significant wear on the Scotch yokes when combustion takes place. Known Scotch yokes design, for example, U.S. Pat. No. 1,687,425, include features to deal with this wear, but not to reduce or prevent the wear.

BRIEF SUMMARY OF THE INVENTION

The present invention addresses the above and other needs by providing an opposed piston engine including approximately spherical combustion chamber formed by the two opposed pistons in a single cylinder and an intake manifold including gas hooks. The combustion chamber has a small cone shaped extension on each side leading to each of two opposed injectors located in the cylinder wall where the two pistons meet at the top of their stroke. The combustion chamber configuration reduces the surface area of the chamber and increases the burn length by a significant amount compared to known designs. The gas hooks in the intake manifold restrict the flow of exhaust gases into the intake manifold long enough for the pressure in the cylinder to blow down and the exhaust gasses to attain high velocity passing out through the exhaust manifold, allowing the intake ports to be uncovered before the exhaust ports.

In accordance with one aspect of the invention, there is provided a direct injected, two stroke, opposed piston, Internal Combustion (IC) engine with an approximately spherical combustion chamber formed by the two opposed pistons in a single cylinder. The combustion chamber has a small cone shaped extension on each side leading to each of two opposed injectors located in the cylinder wall where the two pistons meet at the top of their stroke. This combustion chamber configuration reduces the surface area of the chamber and increases the burn length by a significant amount over all known prior art.

In accordance with another aspect of the invention, there are provided crankshafts at both ends of the engine are rotationally connected through gears, chains, belts or the like so that the reciprocating weights on both sides are counterbalanced providing a smooth running engine. This is an inherent beneficial characteristic of well designed opposed piston engines.

In accordance with yet another aspect of the invention, there is provided intake ports in one end of the cylinder and exhaust ports on the other end of the cylinder are about the same size but are located so that the intake ports are partially uncovered by one of the pistons before the other piston, traveling at the same speed, starts to uncovers the exhaust ports. This is made possible by the fact that the intake manifold is shaped so that it restricts the flow of exhaust gases out of the cylinder long enough for the pressure in the cylinder to blow down and the exhaust gasses to attain high velocity passing out through the exhaust system. The special intake manifold shape does not significantly restrict the flow of air into the cylinder. Therefore when the exhaust gasses have built up enough momentum through the exhaust system they are able to pull fresh air through the intake ports and completely scavenge and cool the cylinder from the inside before the exhaust ports are covered by the piston. This causes the intake ports to be partially open when the exhaust ports close which gives the intake air time to compact into the cylinder before the intake ports close.

In accordance with still aspect of the invention, there is provided combustion chamber of an opposed piston engine inherently has about half the surface area of a conventional IC engine with the same bore, stroke, and compression ratio. This is primarily due to the lack of a cylinder head over the piston which forms the other side of the combustion chamber in a conventional IC engine. The opposed piston configuration also allows the opportunity to provide the nearly spherical combustion chamber with opposing injectors of the present invention, which even further reduces the surface area of the combustion chamber over all known prior art. This smaller surface area greatly reduces the heat loss during combustion and results in much higher power and engine efficiency.

In accordance with another aspect of the invention, there is provided the increased cooling of the cylinder and pistons by the high flow of fresh air through the cylinder at the bottom of the stroke, and the reduced area of the combustion chamber also have another very beneficial effect. The heat transferred by both radiation and convection from the very hot surrounding surfaces to the new charge of air before and during compression is greatly reduced which also increases the power and efficiency of the engine.

In accordance with yet another aspect of the invention, there is provided an outer portion of the tops of the pistons surrounding the combustion chamber in the conventional diesel engine with the afore mentioned partial toroidal shaped combustion chamber are flat and are designed to come within close proximity of the head at the top of their stroke. This area is often referred to as the “squeeze area” because it squeezes the compressed air between that part of the piston and the head above it out at high velocity from all directions into the combustion chamber at about the time of initial combustion. This helps mix the air with the fuel and promotes more complete combustion with reduced formation of NOx.

In accordance with still another aspect of the invention, there is provided tops of the pistons surrounding each half of the combustion chamber in the engine of the present invention are at the same angle with respect to the center axis of the cylinder, so that when the pistons come together at the top of there stroke they squeeze the compressed air at high velocity into the combustion chamber from each side in parallel directions. This causes a cyclone effect in the combustion chamber with the vortex running from one injector to the opposing injector. Spraying fuel into this vortex greatly reduces the fuel particle size, promotes complete combustion, increases power, and reduce the formation of NOx over all known prior art.

In accordance with another aspect of the invention, there is provided fuel being sprayed into the combustion chamber from each side of the cylinder not only greatly increases the burn length but it also causes the fuel from both sides to be sprayed into the burning fuel from the other side which essentially eliminates unburned fuel including PM10.

In accordance with still another aspect of the invention, there is provided an embodiment of the invention is the same as the first preferred embodiment except that it employs bearing guided Scotch yokes on spring loaded pistons. The spring loaded pistons have two functions; they allow the hot combustion gasses to expand and drop in temperature much quicker which reduces the heat loss to the surroundings and increases the efficiency of the engine. They also reduce the high impact load of combustion so that low friction, high efficiency roller bearings can be successfully fitted to the crankshafts.

In accordance with yet another aspect of the invention, there are provided roller bearings on the crankshafts allow the use of Scotch yokes rigidly connected to the pistons and guided and supported by bearings. This configuration keeps the side loads, normally caused by the oscillating connecting rods, off the pistons which greatly reduces the frictional drag and the wear on the piston skirts, especially at high speeds.

In accordance with another aspect of the invention, there is provided a two cycle engine which does not require forced induction. The design of Hook regions in the intake ports allows the engine to operate without any form or supercharging, thereby improving efficiency by eliminating any parasitic effects of supercharging.

It can be seen from the description of the prior art and the above summary of the present invention, how this unique, new concept of an internal combustion engine can overcome many of the inefficiencies of the prior art.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
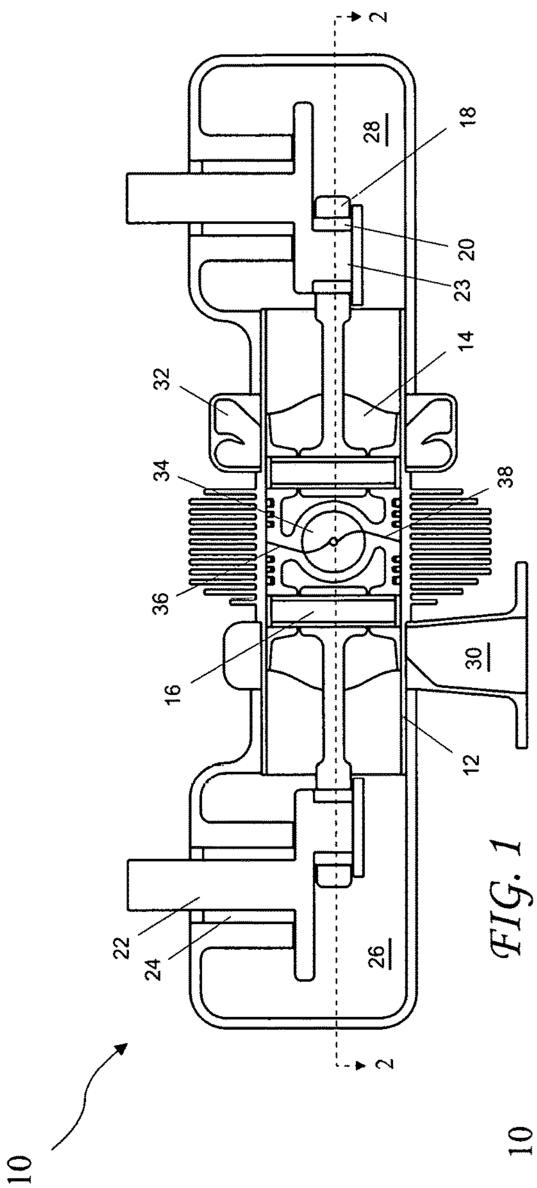
FIG. 1 is a cross-sectional top view depicting internal components of a one cylinder two piston opposed piston engine according to the present invention viewed with the pistons at Top Dead Center (TDC).

FIG. 1 is a cross-sectional top view through the center of a first embodiment an internal combustion opposed piston engine 10, viewed from the top, depicting internal parts with pistons 14 at Top Dead Center (TDC). The opposed piston engine 10 has one cylinder 12, two pistons 14 each with a pin 16, two connecting rods 18 each with a journal bearing 20 on crankshaft throw 23, two crankshafts 22 each with a journal main bearing 24, two crankcases 26 and 28 each securely attached to one of the two different ends of cylinder 12, and an exhaust manifold 30 and an intake manifold 32 each surrounding cylinder 12. The two crankshafts 22 are connected together by gears, chains, or the like (not shown) to keep them turning at the same speed so that the pistons 14 each come together at the top of their stroke at the same time.

The almost spherical combustion chamber 34 has the least possible area for its volume which reduces the heat transfer to its surroundings increasing the efficiency and power of each stroke. The squeeze area 36 and 38 at the top of each piston 14 on each side of the combustion chamber 34 are at the same angle with respect to the center axis of the cylinder 12, so that when the pistons 14 come together at the top of there stroke they squeeze the compressed air at high velocity into the combustion chamber 34 from each side in parallel directions. This causes a cyclone effect in the combustion chamber 34 with the vortex running from one side of the cylinder 12 to the other. Spraying fuel into this vortex reduces the fuel particle size, promotes complete combustion, increases power, and reduce the formation of NOx.

Figure 2:
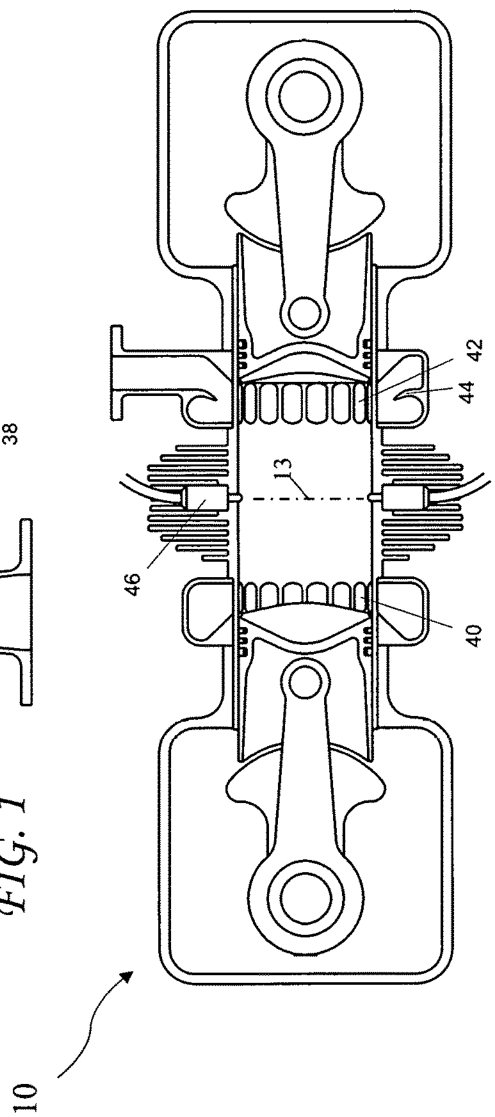
FIG. 2 shows a cross-sectional front view of the opposed piston engine according to the present invention taken along line 2-2 of FIG. 1 viewed from the ends of the crankshafts with the pistons at Bottom Dead Center (BDC) exposing the large intake and exhaust ports in each end of the cylinder.

FIG. 2 is also a cross-sectional front view of the engine 10, taken along line 2-2 of FIG. 1, viewed from the ends of the crankshafts, with the pistons at Bottom Dead Center (BDC). When the pistons 14 reach BDC the exhaust ports 40 and intake ports 42 are fully uncovered but as the pistons 14 move outward the intake ports 42 start to open first. This is made possible by the gas hook 44 creating a gas hook region 44*a* (see FIG. 7) in the intake manifold 32. As the intake ports 42 begin to open, the exhaust gases rush out into the gas hook 44 where they are turned around and block the gas from coming out of the intake until the exhaust ports 40 open and the exhaust pressure completely blows down.

The gas hook 44 in the intake manifold 32 does not significantly restrict the flow of air into the cylinder 12. Therefore when the gasses rushing out through the exhaust system have built up enough momentum they are able to pull fresh air through the intake ports and completely scavenge and cool the cylinder from the inside. The intake ports 42 are partially open when the exhaust ports 40 close which gives the intake air time to compact into the cylinder 12 before the intake ports close, even at high speed.

The two fuel injectors 46 in the side of the cylinder 12 spray fuel directly at each other through the cone shaped cavities 48 on each side of the spherical combustion chamber 34. This not only increases the burn length but it also promotes complete combustion by causing the fuel to be sprayed into an existing ball of flame coming from the other side.

Figure 3:
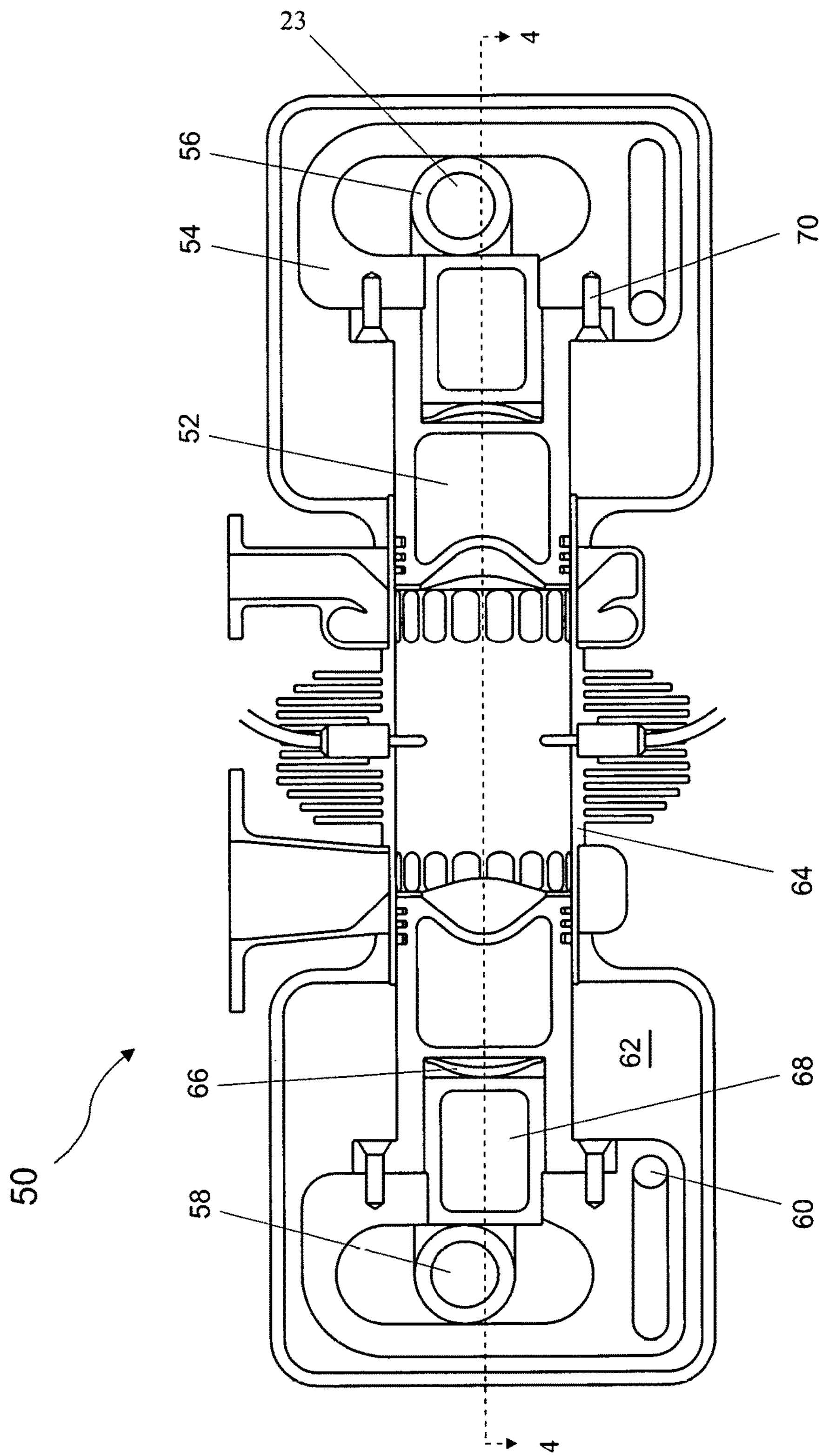
FIG. 3 is a cross-sectional front view depicting internal components of a second embodiment of an opposed piston engine according to the present invention viewed in the direction of the rotational axis of the crankshafts with the pistons at BDC.

FIG. 3 is a cross-sectional front view depicting the internal parts of a second two cylinder opposed piston engine 50, viewed through the center of one of the cylinders in the direction of the rotational axis of the crankshafts with the pistons at bottom dead center (BDC). The engine 50 in FIG. 3 is the same as engine 10 in FIGS. 1 and 2 except that it has two cylinders and it does not employee a conventional rod to connect the piston to the crankshaft. The pistons 52 are rigidly connected to the Scotch yokes 54 which are guided by the roller bearings 56 on the crankshafts 58, the roller bearings 60 mounted on the crankcases 62, and the cylinders 64. The springs 66 are preloaded residing in compression between the followers 68 and the pistons 52 by the screws 70 that hold the Scotch yokes 54 and the pistons 52 together, and the followers 68 reside in compression between the throws 23 to couple linear motion of the pistons 52 to rotational motion of the throws 23. The preload on the springs 66 is just high enough for the maximum pressure in the cylinders 64 near Top Dead Center (TDC) at combustion to almost fully compress the springs 66 which takes the high impact load of the combustion off of the roller bearings 56. As the pistons 52 move away from TDC and towards Scotch yokes 54, the energy stored in the springs 66 is re-captured.

Figure 4:
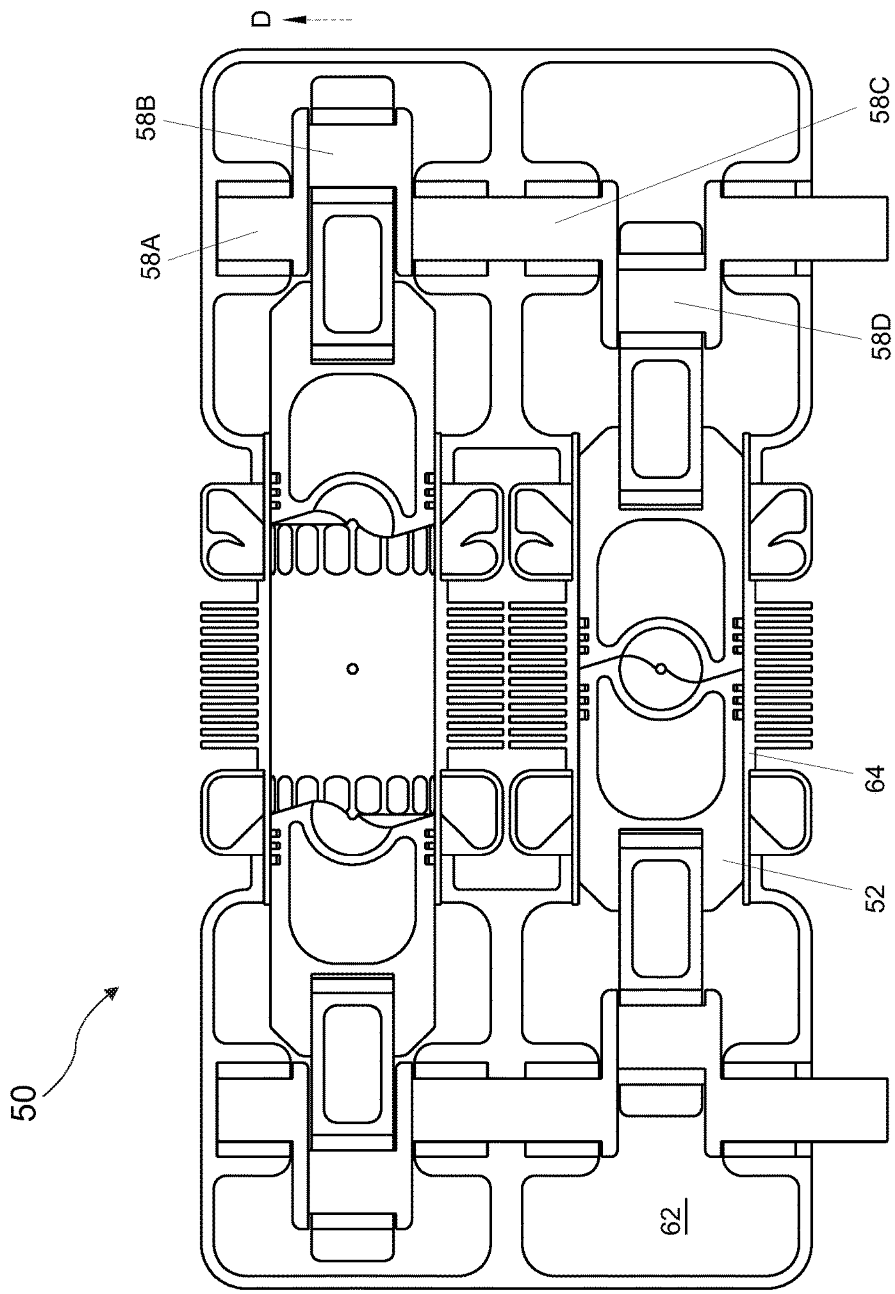
FIG. 4 shows a cross-sectional view of the second embodiment of an opposed piston engine according to the present invention taken along line 4-4 of FIG. 3 with two of the pistons at BDC and the other two at TDC.

FIG. 4 is a cross-sectional view of the engine 50 taken along line 4-4 of FIG. 3 and viewed from the top with one set of pistons 52 at BDC and the other at TDC. The crankshafts 58 are assemblies of four different parts, 58A, 58B, 58C, and 58D to allow the roller bearings to be pressed onto the shafts before they are assembled.

Figure 5:
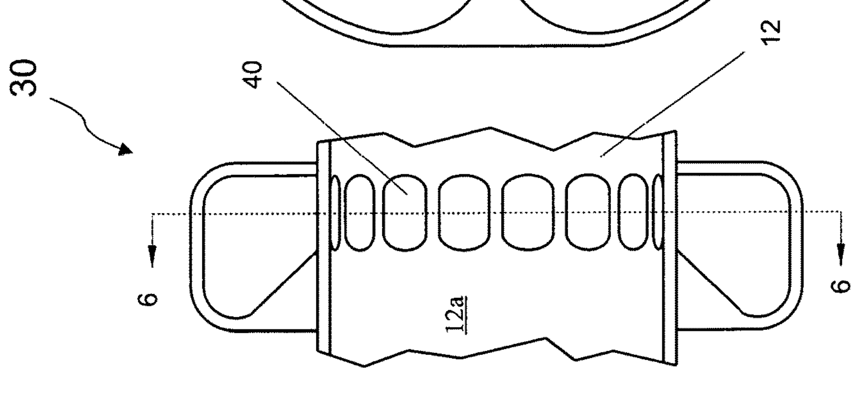
FIG. 5 is a cross-sectional view of an exhaust manifold attached to either opposed piston engine according to the present invention through the longitudinal axis of the cylinder depicting a portion of the exhaust end of the cylinder without a piston, but with the exhaust manifold installed over the ports.

FIG. 5 is a cross-sectional view of the exhaust manifold 30 of both engines 10 and 50 through the longitudinal axis of the cylinders 12 depicting a portion of the exhaust end of the cylinder 12 without a piston, but with the exhaust manifold 30 installed over the exhaust ports 40 and showing the exhaust ports 40 in the cylinder call 12*a*.

Figure 6:
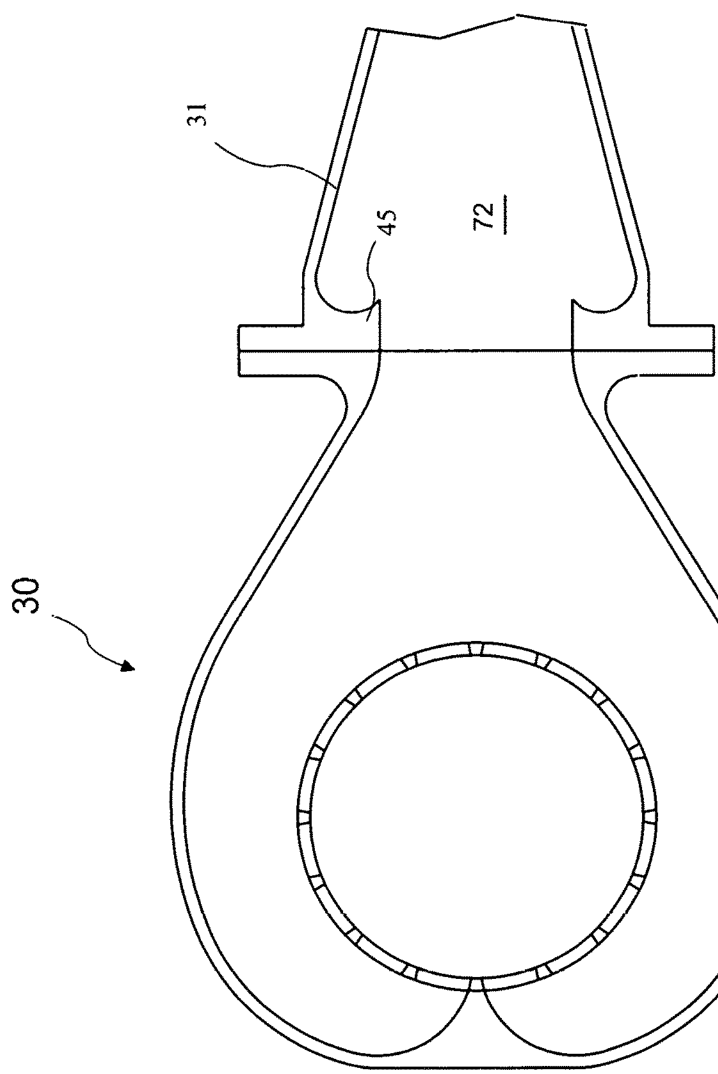
FIG. 6 is a cross-sectional view of the exhaust manifold taken along line 6-6 of FIG. 5 through the ports and perpendicular to the longitudinal axis of the cylinder illustrating the flow path for exhaust leaving the cylinder. An exhaust gas hook 45 restricts a flow of exhaust back into the cylinder.

FIG. 6 is a cross-sectional view of the exhaust manifold 30 taken along line 6-6 of FIG. 5 through the ports and perpendicular to the longitudinal axis of the cylinder illustrating the flow path for exhaust leaving the cylinder. A gas hook 72 is mounted over the exit port of the exhaust manifold 30 to stop any back flow of exhaust gases.

Figure 7:
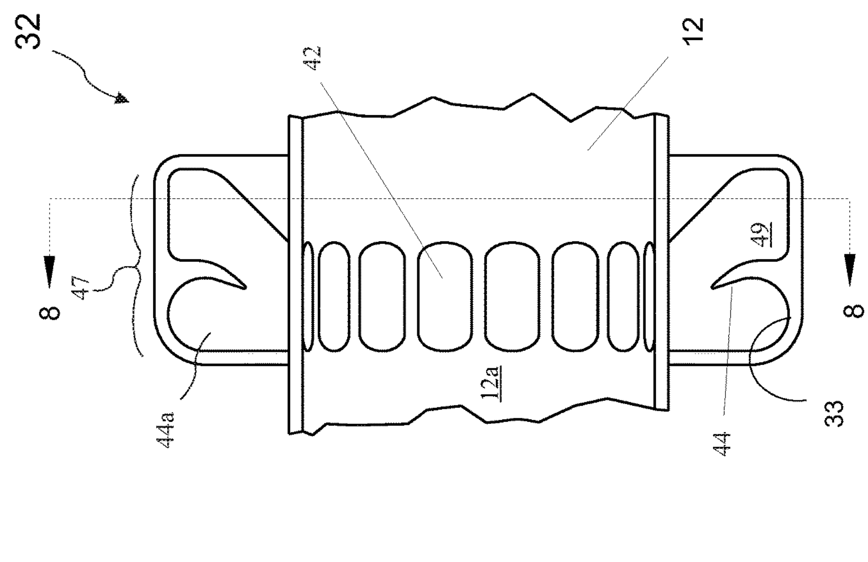
FIG. 7 is a cross-sectional view of the intake manifold attached to either engine through the longitudinal axis of the cylinder depicting a portion of the intake end of the cylinder without a piston, but with the intake manifold installed over the ports.

FIG. 7 is a cross-sectional view of the intake manifold 32 for use on either engine 10 or 50 through the longitudinal axis of the cylinders 12 depicting a portion of the intake end of the cylinder 12 without a piston, but with the intake manifold 32 installed over the intake ports 42 and showing and intake path 33 and the intake ports 42 in the cylinder wall 12*a*, and a concave arced inner surface 33*a* of the intake manifold 32.

Figure 8:
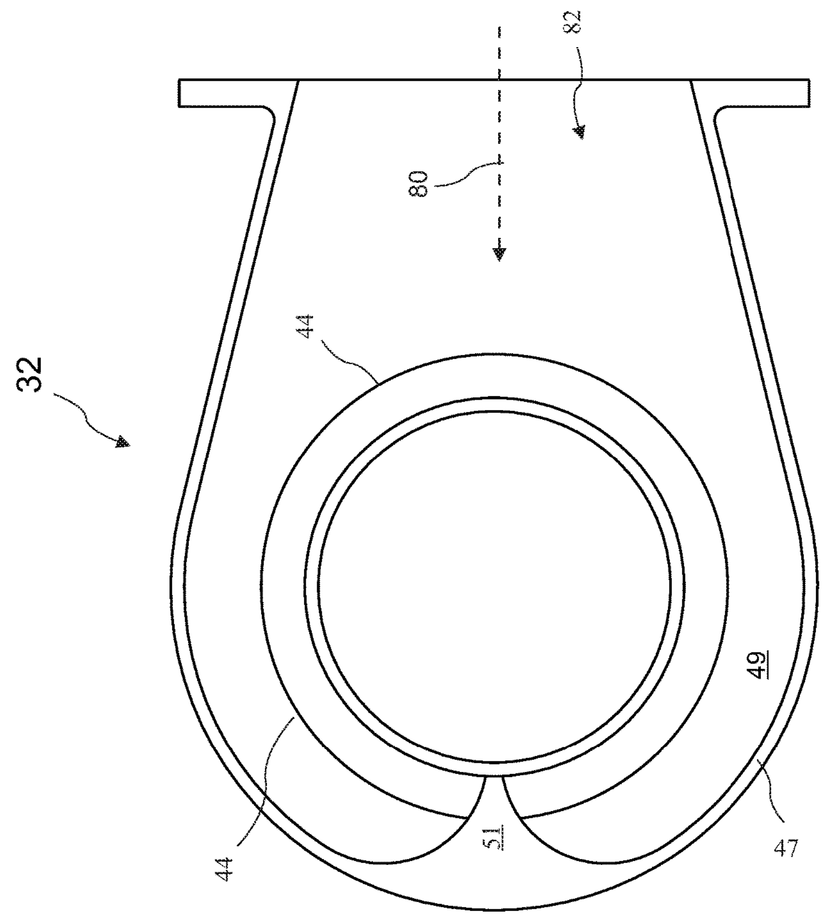
FIG. 8 is a cross-sectional view of the intake manifold taken along line 8-8 of FIG. 7 through the outer portion of the chamber and perpendicular to the longitudinal axis of the cylinder illustrating the air flow path into the cylinder.

FIG. 7 is a cross-sectional view of the intake manifold 32 attached to either engine 10 through the longitudinal axis of the cylinder 12 depicting a portion of the intake end of the cylinder 12 without a piston, but with the intake manifold 32 installed over the intake ports 42, and FIG. 8 is a cross-sectional view of the intake manifold 32 taken along line 8-8 of FIG. 7 through the outer portion of the chamber and perpendicular to the longitudinal axis of the cylinders 12 illustrating the air flow path into the cylinders 12. Air 80 entering the engine 10 through a radially extending intake air passage 82 in the intake manifold 32 is preferably at ambient air pressure and the engine 10 does not require any form or supercharging due to the combination of the intake manifold design (e.g., the gas hook 44) and the timing provided by the port 42 placement. The air 80 is preferable not obstructed by any form of valve. The gas hook 44 reaches in towards the intake ports 42 from a manifold outer wall 47 of the intake manifold and the gas hook region 44*a* has a concave gas hook region outer wall 33. The air 80 first enters an offset region 49 having a splitter 51 opposite to the passage 82, and then towards the intake ports 41.

Figure 9:
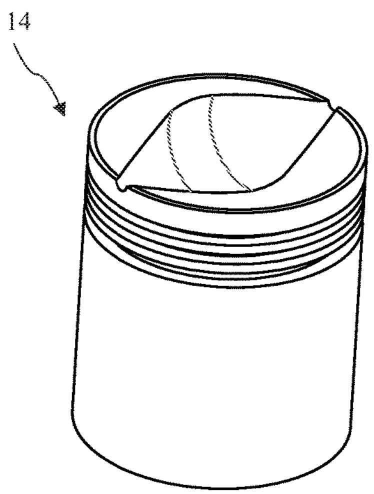
FIG. 9 is a perspective view of a piston according to the present invention.
Figure 10:
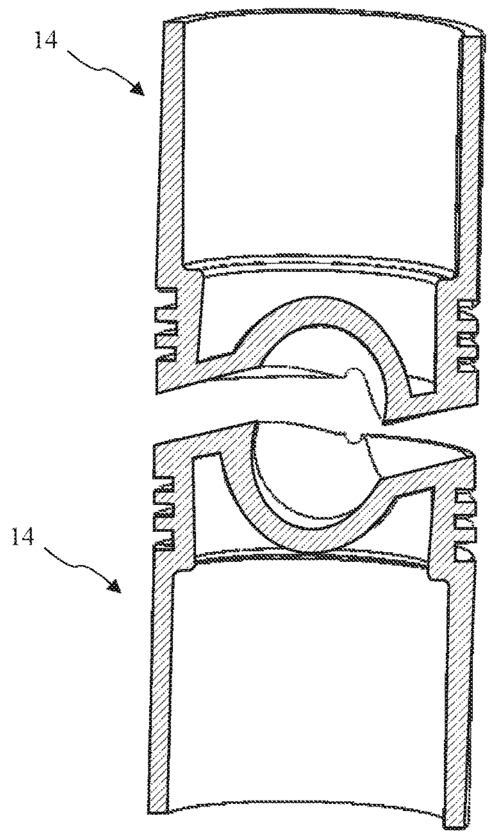
FIG. 10 is a cross-sectional view of two pistons according to the present invention.
Figure 11:
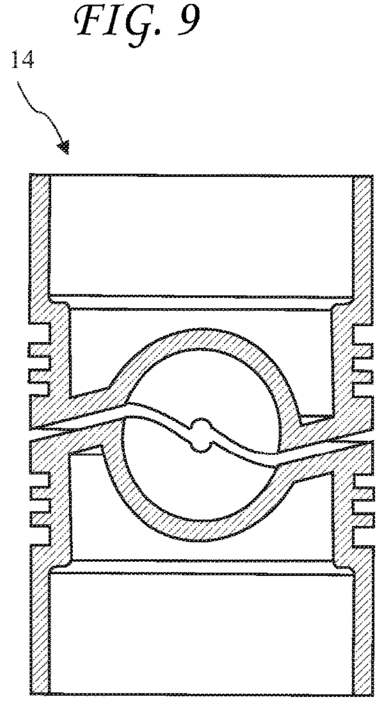
FIG. 11 is a second cross-sectional view of the two pistons according to the present invention.

FIG. 9 is a perspective view of a piston 14 according to the present invention, FIG. 10 is a cross-sectional view of two pistons 14 and FIG. 11 is a second cross-sectional view of the two pistons 14. The pistons 14 include mating concave and convex top surfaces.

While the invention herein disclosed has been described by means of specific embodiments and applications thereof, numerous modifications and variations could be made thereto by those skilled in the art without departing from the scope of the invention set forth in the claims.

I claim:

1. A two strokes per cycle, internal combustion, direct injected, opposed piston engine comprising:

at least two crankshafts rotationally coupled;

at least two pistons traveling in opposite directions;

at least one cylinder with intake ports toward one end of the cylinder and exhaust ports toward an opposite end of the cylinder, the intake and exhaust ports located so that the intake ports are opened first when the pistons are moving apart, and the intake ports are closed last as the pistons move inward; and an intake manifold covering the intake ports and having an internal shape comprising a circular gas hook region inside the intake manifold circling the cylinder and radially bordered by a concave gas hook wall, and laterally bordered by a gas hook reaching in from a manifold outer wall towards the intake ports and configured to reverse a direction of the flow of exhaust gases back towards the intake ports, for reducing exhaust gases flowing into the intake manifold;

wherein the intake ports in the intake manifold are in fluid communication with ambient air at ambient air pressure.

2. The engine of claim 1, further including an exhaust manifold including a second inner shape for stopping exhaust gases from flowing back into the engine through the exhaust ports.

3. The engine of claim 2, wherein the inner surface shaped for stopping exhaust gases from flowing back through the exhaust ports is a gas hook in the exhaust manifold.

4. The engine of claim 1, wherein linear motion of the pistons is coupled to rotational motion of the crankshafts by Scotch yokes through followers residing in compression between the pistons and throws of the crankshaft, wherein springs reside in compression between the pistons and the throws, and the springs are compressed by motion of the pistons towards the throws reducing an impact load of combustion on the throws.

5. The engine of claim 4, wherein the pistons and Scotch yokes are guided by bearings mounted on the crankcases.

6. The engine of claim 1, wherein the combustion chambers formed by the shape of the tops of the pistons are almost spherical except for the tangent cone shaped portions extending on opposite sides to the cylinder where the fuel injectors are located.

7. The engine of claim 1, wherein air entering the engine through the intake ports is not obstructed by any form of intake valve at any time.

8. The engine of claim 1, wherein the pistons travel at a same speed and accelerate at a same rate.

9. The engine of claim 1, further including a squeeze area at the top of the each piston on each side of the combustion chamber that is at the same fifty to eighty degree angle with respect to the center axis of the cylinder.

10. A two strokes per cycle, internal combustion, direct injected, opposed piston engine comprising:

at least two crankshafts rotationally coupled, the crankshafts including crankshaft throws converting linear to rotation motion;

at least one cylinder between the crankshafts;

at least two pistons traveling in opposite directions in the at least one cylinder and coupled to the crankshaft throws using Scotch yokes;

springs residing in compression between the pistons and the throws, the springs compressed by motion of the pistons towards the throws reducing an impact load of combustion on the throws, wherein the pistons are fixedly attached to the Scotch yokes; and followers reside between the pistons and throws of the crankshaft, the followers conducting motion of the pistons to the throws.

11. The engine of claim 10, wherein the followers slide within the Scotch yokes between the pistons and the crankshaft throws and couple motion of the pistons to the crankshaft throws.

12. The engine of claim 11, wherein the springs reside between the pistons and the followers.

13. The engine of claim 12, wherein the sliding motion of the followers in the Scotch yokes is parallel with the motion of the pistons.

14. The engine of claim 1, wherein the intake manifold circumferentially surrounds the cylinder.

15. The engine of claim 1, wherein the intake manifold includes an intake air passage offset axially in the direction of piston motion from the circular gas hook region.

16. The engine of claim 1, wherein the circular gas hook region faces an inner portion of the intake ports first opened by outward motion of the pistons before the entire intake ports are opened.

* * * * *